Patented Mar. 23, 1948

2,438,353

UNITED STATES PATENT OFFICE 2,438,353

METHOD OF CONTROLLING THE GROWTH AND FATTENING RATE OF LIVESTOCK AND POULTRY AND COMPOSITION USED IN CONNECTION THEREWITH

Charles W. Turner and Ezra P. Reineke, Columbia, Mo., assignors to American Dairies Incorporated, Kansas City, Mo., a corporation of Maryland, and The Quaker Oats Company, Chicago, Ill., a corporation of New Jersey, jointly No Drawing. Application December 8, 1943, Serial No. 513,496

13 Claims. (Cl. 99—2)

Our invention relates to methods for controlling the fattening rate of livestock and poultry and refers more particularly to methods of increasing the rate of fattening of all types of meat producing mammals and birds by inhibiting the endocrine function of the thyroid gland or depressing the secretion of a hormone of the gland and by decreasing the rate of energy metabolism of the animal and by decreasing the rate of secretion of certain hormones of the anterior pituitary, in particular the gonadotropins and fat metabolism factor. More specifically our invention comprises the following methods of administration such as feeding the ration, adding to the water or other fluid, adding as a part of grit fed to birds, giving as separate pellets or capsules, administering by injections, or by the implantation of pellets, any one of a series of compounds of low toxicity related to thiourea or its derivatives, such as thiouracil, which have in common the thioureylene radical —NH·CS·NH—. Administration by any of the above methods is made to animals or birds in predetermined critical amounts sufficient to decrease the rate of energy metabolism, sex urge, and production of the pituitary fat metabolism factor in order to increase the rate of deposition of fat to an optimum degree.

The method of increasing the deposition of fat contemplated by this invention is most effective in mammals and birds of the various species and types which have a normal tendency to fatten slowly. In growing animals, however, where lean meat deposition normally predominates at the expense of fat deposition, the instant methods would be effective in turning the nutrients consumed toward fat deposition.

It is recognized that the removal of the sex glands (for example from steers and spayed animals) causes them to become more quiet and to fatten more readily. The present method may be used as a substitute for the foregoing and will produce these effects without surgical intervention.

A further economic value to be obtained by the practice of our invention lies in the reduction in time required to attain the proper degree of fattening or finish and the saving of prolonged maintenance necessitated by normal fattening methods, besides the fattening of many animals to a degree not normally obtainable by conventional surgical methods.

In our co-pending application Serial No. 501,988, filed September 11, 1943, now Patent No. 2,385,117, issued September 18, 1945, there is described a method by which the rate of growth of fowls can be stimulated at the expense of fat deposition. The present method contrary-wise contemplates the administration of any one of a group of chemical compounds to be absorbed by livestock or poultry which has an opposite physiological effect, namely, altering the composition of any increments of gain in the animal body from lean meat of nitrogenous composition to that of adipose or fat tissue. Thus, these two applications are complementary in nature, the former providing stimulation and more rapid growth, the latter providing a method by which the fattening process is accelerated. It is contemplated also in the present method to combine the two inventive concepts and thereby control the fattening rate of the livestock or poultry to which the compounds are given.

Heretofore, besides the surgical methods previously mentioned, the character of rapid fattening of meat animals has been accomplished primarily by genetic methods, that is, by the breeding and selection of animals having the desired characteristics. However, many types of animals when so selected are slow growing and lack the desirable and related productive processes of milk production, egg production, and other necessary qualities to a greater or lesser degree. When animals are selected for their ability as high milk producers, or when a species of poultry is selected for high egg production, it is usually the case that the rapid fattening character of the animal or bird is ignored or at least becomes a secondary factor. By our method it will be possible to control the fattening rate of animals lacking this genetic character to a considerable extent, or at least to the extent that it may assume a more valuable characteristic of the species. Thus, the so-called "dual purpose" animals may be stimulated to increase growth and production on one hand, and may be caused to increase their rate of fattening on the other hand to the economic advantage of the feeder.

To our knowledge, although the use of thiourea and some of its compounds and derivatives, including thiouracil, have been used to inhibit the function of the thyroid gland and in connection with the treatment of hyperthyroidism, these compounds have not been employed for the fattening of livestock and poultry, nor have they been used in conjunction with thyro-active materials such as desiccated thyroid, thyroxine, Protamone (protein iodinated to the extent that the result product possesses properties for stimulating metabolism), or other iodinated compounds having metabolic stimulating properties.

The critical nature of the dosage necessary to obtain the results contemplated without undesired or toxic effects should be emphasized. However, because of the species and breed differences of animals the requirements and dosage for different species and breeds will be indicated only within broad limits. Furthermore, the many compounds and derivatives of thiourea and related compounds such as thiouracil vary so greatly in activity with respect to their ability in influencing the fattening per unit of body weight that any arbitrary or set percentage of relationship of the component to the diet is difficult to specify even in general terms. In addition, the duration of fattening process, age, type of animal, and other related factors will influence and determine the most satisfactory level of administration.

As the physiologically active substances in compounds containing the thioureylene radical have varying degrees of potency in promoting the rapid deposition of fat, the following examples are suggested without being intended as limitations to the invention with respect to dosages, routes of administration or compounds indicated.

*Example I.*—In the fattening of poultry such as chickens, ducks, geese and turkeys, there was added to the usual fattening ration thiourea or thiouracil in amounts varying from 0.01 per cent to 0.15 per cent of the water by weight and offered ad libitum. The thiourea compounds can also be coated on grit or cracked oyster shells so that the requisite amounts may be consumed. Normally, the daily consumption of thiouracil should vary between 3 to 12 milligrams per 100 grams of body weight of the poultry fed.

A satisfactory method of administering thiourea or related compounds to the fattening ration is by mixing 4.5 grams to 67.5 grams with each 100 pounds of feed. Groups of poultry fed a fattening ration containing 45 grams of thiouracil per 100 pounds of feed normally increase in body weight more rapidly than the control specimens and a comparative examination of the carcasses of the two groups indicate a greater covering of fat in those given the thiouracil.

*Example II.*—The dosage for stimulation of rabbits and other small animals can be based on about the same percentage of feed as poultry for satisfactory results.

*Example III.*—Some breeds of swine fatten poorly and even individuals in other breeds which make rapid gains have a poor fattening rate. By feeding such animals a grain mixture of protein supplement to which has been added thiourea, thiouracil, or related compounds on the basis of 0.1 gram to 0.6 gram per 100 pounds of body weight, an improved rate is established. If these compounds are fed as a complete part of the fattening ratio then from 4.5 grams to 67.5 grams per 100 pounds of feed is proper. Percentages of the compound based upon 100 pounds of feed or upon the weight of water consumed would range between 0.01 per cent to 0.15 per cent. If the compounds are injected subcutaneously from 0.1 gram to 0.6 gram per 100 pounds of body weight will accomplish substantially the same results.

*Example IV.*—While horses are not usually fattened for meat purposes, it may at times be advantageous to fatten horses for sale as work animals. The dosages indicated for swine are adapted to the fattening of horses as well.

*Example V.*—Sheep of the best wool breeds and all types of goats tend to fatten rather slowly on normal fattening rations. To increase the rate of fattening these animals thiourea or related compounds may be added to the grain ration in amounts varying between 0.01 per cent to 0.15 per cent per 100 pounds of feed or between 4.5 grams to 67.5 grams per 100 pounds of feed. Likewise equivalent amounts may be administered as part of the drinking water or in capsule form. If injection is preferred, the dosage will range from 0.1 gram to 1 gram per 100 pounds of body weight per day.

*Example VI.*—The dosage of cattle is that indicated for sheep and goats.

Besides increasing the fattening rate of meat producing animals and birds there is at the same time detected an improved quality, palatability, texture and flavor to the flesh. These effects are evidently produced as a result of the action of the compounds which depress or inhibit the release of energy metabolism by the animal tending to increase the storage of the food consumed in the form of adipose tissue. The depression of activity of the reproductive glands of the male and female animals thus depresses sexual urge and tends to quiet the animal or bird, thus reducing useless expenditure of energy during the fattening process.

Thiourea and its derivatives including thiouracil are relatively simple compounds which can be prepared cheaply and in large quantities. They can be easily and properly administered both to ruminant and non-ruminant animals, and poultry with equal efficiency and effectiveness. In ruminant animals larger amounts are required because of utilization by rumen organisms. However, in the case of thiourea different compounds can be used as a substitute for high priced protein in the ration due to its conversion into bacterial protein. As the requirements of animals for the compounds and for food increase in proportion to their body weight, the administration in the feed assures that the animals and birds receive the requisite amounts of the compounds or their equivalents regardless of their size or weight. Investigations show that compounds and derivatives of thiourea are not uniform in their action upon thyroid activity and in fact, some of the compounds have been found to be inactive in the suppression of thyroid activity. Consequently, it is desired here to include only such compounds as will produce the desired results, and to date the most effective and economic have proven to be thiouracil and thiourea.

Experiments indicating results obtained upon different types of livestock and poultry as well as the preferred time for the administration of the compounds will be found in the tabulation which follows:

I. Period for administration in the life span of the livestock or poultry.
  A. Poultry examples:
    1. Many chickens are killed for market at the age of 12 weeks. If they are fed Protamone continuously for the 12 weeks period their growth is fast, but they are muscular and have very little fat.
      To fatten and obtain more marketable birds, the following methods of feeding have been tried with varying results according to the breed, manner of administration and other influencing factors:
      a. Feed Protamone for 8 weeks and thereafter a reduced amount of Protamone plus thiourea for at least 4 weeks.
      b. Feed Protamone for 8 weeks, discontinue the Protamone and feed thiourea alone thereafter.
      c. Feed no Protamone during the first 8 weeks and thiourea alone for the last 4 weeks.
      d. Feed no Protamone during the first 8 weeks and a combination of Protamone plus thiourea during the last 4 weeks.
    2. Older birds are marketed at 16, 20 and 24 week periods respectively. Suggestions for the feeding of these birds where there has been a preliminary administration of Protamone or where Protamone has not been used preliminarily follows:
      a. Near the end of the feeding period or from 4 to 6 weeks before marketing thiourea is fed alone.
      b. From 4 to 6 weeks before marketing thiourea plus Protamone is fed.
        Actually, the growth can be stopped and fattening increased at any time preceding marketing. In cocks this may be when fertile eggs are no longer desired, or in hens after their pullet egg production stops.
  B. Swine.
    1. Swine are usually marketed when they have a body weight ranging from 225 to 250 pounds. Thiourea alone or thiourea plus Protamone should be fed for the last part of the fattening period, varying from 30 to 60 days.
  C. Sheep.
    1. Lambs are usually marketed when they reach a body weight of from 50 to 100 pounds. They are usually kept growing and fattening over substantially the same period of time, consequently, it may prove advantageous to cause a slight inhibition of thyroid activity over the entire growing and fattening period, or a more rapid fattening period may be selected at the end of the period of growth with substantially greater suppression of the thyroid activity.
    2. Feeder sheep are raised on the western range and then brought near markets to fatten. The length of the fattening period is usually several months during which sufficient thiourea is administered to produce partial suppression of the thyroid, or enough to produce complete suppression, plus enough Protamone to maintain feeding habits.
    3. The length and character of administration for fattening older discarded breeding animals would depend upon their physical condition.
  D. Cattle.
    1. As there are so many different types and classes of cattle, the time and character of the dosage of thiourea which would be most useful under the different conditions prevailing is difficult to prescribe. For young beef cattle a growth period on Protamone would precede a rapid fattening period on thiourea or combinations of thiourea and Protamone. Older animals could be fattened on thiourea alone or in combination with Protamone without a preliminary feeding of Protamone. Undoubtedly the different breeds will react advantageously to one type of administration while others will do better on different methods.

This invention contemplates the use of thiourea alone or Protamone in combination with thiourea for fattening of poultry or livestock. The amounts of the respective compounds, the manner of administration and the way in which thiourea and the Protamone are combined in their administration, or the period of time in the life span of the animal or bird during which the administrations are made may be varied according to the livestock to be fattened and the requirements of the feeder.

As a directive to determine amounts of thiourea necessary it is suggested:

1. To determine for each species and breed the minimum amount of thiourea necessary to entirely suppress thyroid activity.
2. At this level fattening will proceed at a maximum rate for a short time. For example, in chicks 1 to 4 weeks, in cattle 4 to 8 weeks, in sheep 2 to 6 weeks.
3. If the fattening period is to be lengthened it will be necessary to
  a. Partially suppress the thyroid secretion so that the secretion rate will be from one-fourth to three-fourths normal.
  b. Entirely suppress thyroid secretion and add sufficient Protamone to equal one-fourth, one-half, or three-fourths normal thyroid gland action, depending upon the length of time it is desirable to extend the fattening period.
4. Since different breeds and individuals vary as to their normal thyroid secretion rate, the procedure suggested under 3—a above may be more difficult to practice than the procedure under 3—b where thyroid activity is entirely blocked and sufficient Protamone subsequently administered to bring up the desired thyroid level.
5. The amount of thyroid depressant sufficient to limit thyroid activity is the smallest amount of the particular compound which will prevent in part or entirely the secretion of thyroxine by the thyroid gland. When thiourea or thiouracil are administered alone it may become desirable to prevent the secretion of thyroxine by the thyroid gland in part only to the extent of 25 per cent, 50 per cent, or 75 per cent, depending upon the duration of the fattening period. Thus, if the fattening period is of short duration for any given type or class of market animals, the amount of compound sufficient to cause total suppression of thyroxine secretion would be desirable. As the duration of the fattening process lengthens it is necessary to limit thyroid activity in part by reducing the amount of compound administered or to suppress the thyroid entirely and supplement the suppressant compound with sufficient Protamone to sustain normal feeding habits.

To recapitulate, the invention resides in the administration of a substance of low toxicity containing the thioureylene radical —NH·CS·NH— to either livestock or poultry in different manners:

A. Sufficient to limit the thyroid activity to a predetermined degree.
B. In amount sufficient to arrest the thyroid activity accompanied by administration of a thyro-active material in amounts adapted to preserve normal feeding habits.
C. Administering a thyro-active material during the initial stages of the life span of the livestock or poultry and administering the compound containing the thioureylene radical in amount sufficient to arrest thyroid activity and thyro-active material in amounts adapted to preserve normal feeding habits.

From the above tabulation it will be noted that it is contemplated to combine administration of the compounds containing the thioureylene radical with thyro-active material. Thyro-active material when given early in the life span to increase growth rates is administered according to the teachings of our prior application previously noted. When given simultaneously with the compound containing the thioureylene radical the amount of thyro-active material will be proportioned to preserve the normal feeding habits while the thyroid depressant is given in amounts sufficient to arrest thyroid activity.

From the foregoing it will be seen that our invention is well adapted to attain all the ends and objects hereinbefore set forth, together with other advantages which are obvious and which are inherent to the methods disclosed.

Having thus described our invention, we claim:

1. A method of controlling the fattening rate of livestock and poultry comprising the steps of administering to said animal and bird during a limited selected period of their life span a substance of low toxicity containing the thiourelyene radical —NH·CS·NH— in an amount equivalent to a range of 0.01% to 0.15% for each 100 pounds of feed.

2. A method of controlling the growth and fattening rate of livestock and poultry comprising the steps of simultaneously administering to the animal and bird during a limited selected period of their life span a thyroprotein and a substance of low toxicity containing the thioureylene radical —NH·CS·NH—, the latter substance administered in amounts equivalent to a range of 0.01% to 0.15% for each 100 pounds of feed, the thyroprotein in amounts sufficient to preserve normal feeding habits.

3. A method of controlling the growth and fattening rate of livestock and poultry comprising the steps of administering a thyroprotein in predetermined amounts during a selected period of the life span of the animal and bird and thereafter administering a substance of low toxicity containing the thioureylene radical

—NH·CS·NH— in an amount equivalent to a range of 0.01% to 0.15% for each 100 pounds of feed.

4. A method of controlling the growth and fattening rate of livestock and poultry comprising the steps of administering a thyroprotein in predetermined amounts during a selected period of the life span of the animal and bird and thereafter administering thyroprotein and a substance of low toxicity containing the thioureylene radical —NH·CS·NH—, the latter substance administered in amounts equivalent to a range of 0.01% to 0.15% for each 100 pounds of feed, the iodocasein in amounts sufficient to preserve normal feeding habits.

5. A method of controlling the fattening rate of livestock and poultry comprising the steps of administering to said animal and bird during a limited selected period of their life span thiourea in an amount equivalent to a range of 0.01% to 0.15% for each 100 pounds of feed.

6. A method of controlling the growth and fattening rate of livestock and poultry comprising the steps of administering during simultaneous periods of the life span of the animal and bird a thyroprotein and thiourea, the latter substance administered in amounts equivalent to a range of 0.01% to 0.15% for each 100 pounds of feed, the thyroprotein in amounts sufficient to preserve normal feeding habits.

7. A method of controlling the fattening rate of livestock and poultry comprising the steps of administering a thyroprotein in predetermined amounts during a selected period of the life span of the animal and bird and thereafter administering thiourea in an amount equivalent to a range of 0.01% to 0.15% for each 100 pounds of feed.

8. A method of controlling the growth and fattening rate of livestock and poultry comprising the steps of administering a thyroprotein in predetermined amounts during a selected period of the life span of the animal and bird and thereafter administering thiourea, the latter substance administered in amounts equivalent to a range of 0.01% to 0.15% for each 100 pounds of feed, the thyroprotein in amounts sufficient to preserve normal feeding habits.

9. A method of controlling the fattening rate of livestock and poultry comprising the steps of administering to said animal or bird during a limited selected period of their life span thiouracil in an amount equivalent to a range of 0.01% to 0.15% for each 100 pounds of feed.

10. A method of controlling the growth and fattening rate of livestock and poultry comprising the steps of administering during simultaneous periods of the life span of the animal and bird a thyroprotein and thiouracil, the latter substance administered in amounts equivalent to a range of 0.01% to 0.15% for each 100 pounds of feed, the thyroprotein in amounts sufficient to preserve normal feeding habits.

11. A method of controlling the growth and fattening rate of livestock and poultry comprising the steps of administering a thyroprotein in predetermined amounts sufficient to stimulate metabolism during a selected period of the life span of the animal and bird and thereafter administering thiouracil in an amount equivalent to a range of 0.01% to 0.15% for each 100 pounds of feed sufficient to limit thyroid activity to a predetermined degree.

12. A method of controlling the growth and fattening rate of livestock and poultry comprising the steps of administering a thyroprotein in predetermined amounts sufficient to stimulate metabolism during a selected period of the life span of the animal and bird and thereafter administering thiouracil in amounts equivalent to a range of 0.01% to 0.15% for each 100 pounds of feed sufficient to arrest thyroid activity.

13. A stock and poultry feed containing a substance of low toxicity containing the thioureylene radical —NH·CS·NH— in an amount below 0.15% and above the equivalent of 0.01% for each 100 pounds of feed which constitutes the minimum amount sufficient to check thyroid activity in the animal and bird.

CHARLES W. TURNER.
EZRA P. REINEKE.

REFERENCES CITED

The following references are of record in the file of this patent:

UNITED STATES PATENTS

| Number | Name | Date |
|---|---|---|
| 678,330 | Blum | July 9, 1901 |
| 2,098,998 | Brinton | Nov. 16, 1937 |
| 2,130,985 | Lautenschlager | Sept. 20, 1938 |
| 2,294,401 | Harrison | Sept. 1, 1942 |

FOREIGN PATENTS

| Number | Country | Date |
|---|---|---|
| 4,123 | Great Britain | 1900 |
| 21,495 | Australia | 1929 |
| 148,734 | Great Britain | 1920 |
| 7,740 | Great Britain | 1898 |

OTHER REFERENCES

"Endocrinology," by Hoskins, 1941, page 74.

New and Non-official Remedies, 1936, page 242.

Kaer, "The metabolic effects of iodized protein," Klin. Wochschr., vol. 13, 1934, pages 11 to 13, as abstracted in 1934 Chemical Abstracts, page 4793.

Astwood, E. B., Treatment of Hyperthyroidium with Thiourea and Thiouracid, J. A. M. A., vol. 122 (78–81), May 8, 1943.